United States Patent [19]

Gunzel, Jr. et al.

[11] Patent Number: 5,119,993
[45] Date of Patent: Jun. 9, 1992

[54] PORTABLE PARTICULATE MATERIAL SPREADER

[75] Inventors: Rudolph M. Gunzel, Jr., Palm Springs, Calif.; Scott W. Demarest, Caledonia; David J. Edwards, Racine, both of Wis.; Donald J. Shanklin, Fullerton, Calif.

[73] Assignee: S. C. Johnson & Son, Inc., Racine, Wis.

[21] Appl. No.: 605,286

[22] Filed: Oct. 29, 1990

[51] Int. Cl.⁵ .............................................. A01C 15/04
[52] U.S. Cl. .................................. 239/654; 239/600; 406/102
[58] Field of Search ........................ 406/96, 102, 130; 239/528, 654, 600

[56] References Cited

U.S. PATENT DOCUMENTS

| | | | |
|---|---|---|---|
| 1,703,384 | 2/1929 | Birkenmaier | 239/528 X |
| 1,785,932 | 12/1930 | Brown et al. | 239/654 X |
| 2,091,055 | 8/1937 | Roselund et al. | 239/654 |
| 3,403,941 | 10/1968 | Solt | 406/130 X |
| 3,993,225 | 11/1976 | Manni | |
| 3,994,437 | 11/1976 | Kitterman | 239/654 X |
| 4,071,170 | 1/1978 | Gunzel, Jr. et al. | |
| 4,140,280 | 2/1979 | Allen et al. | |
| 4,416,069 | 1/1984 | Kwok | 239/528 X |
| 4,545,509 | 10/1985 | Musschoot et al. | |
| 4,678,377 | 7/1987 | Bouchard | |
| 4,712,716 | 12/1987 | Schloz et al. | |

Primary Examiner—Andres Kashnikow
Assistant Examiner—Kevin P. Weldon

[57] ABSTRACT

An improved portable, self-contained apparatus for spreading particulate material that can, by use of alternate flow improvement and control mechanisms, be used to dispense either dusts (such as insecticides) or granular materials such as fertilizer. The apparatus has a detachable container portion and a dispensing portion which includes, in a chamber, a rotary vane turned by a battery-powered motor, a recurved channel leading from the blower chamber to an outlet nozzle, and a triggering and activation assembly which sequentially activates first the motor and the rotary vane and then the flow improvement and control mechanism.

13 Claims, 6 Drawing Sheets

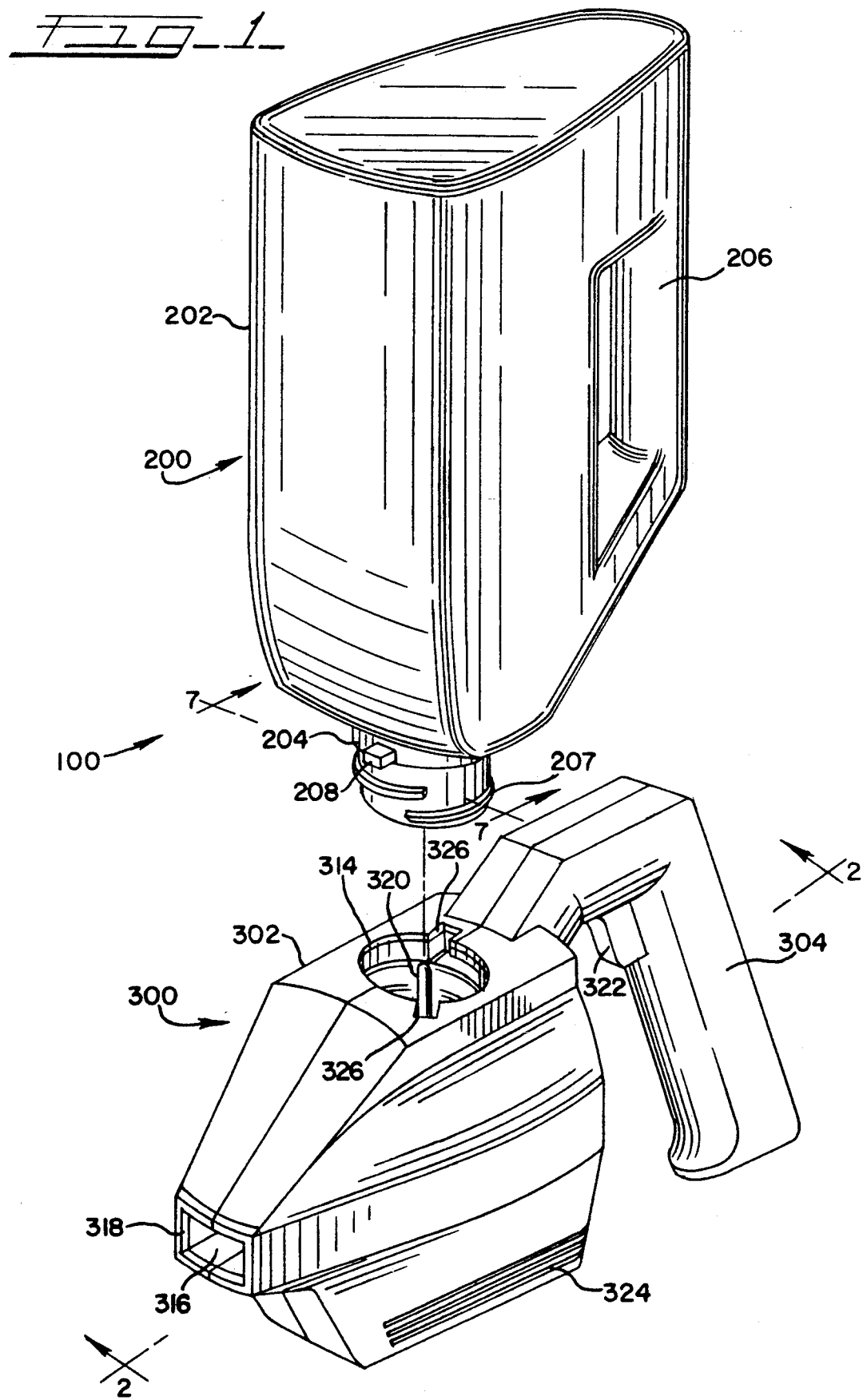

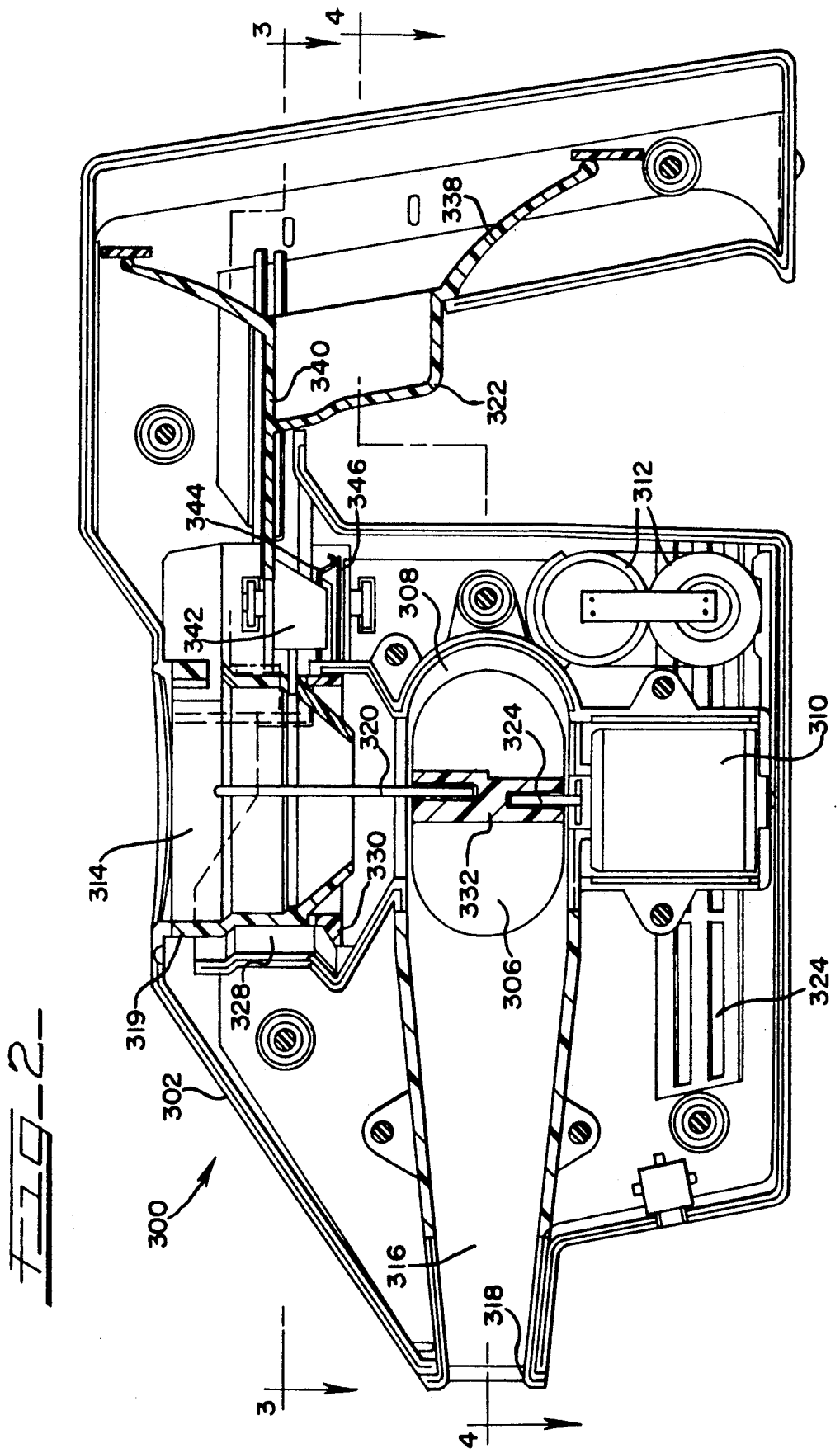

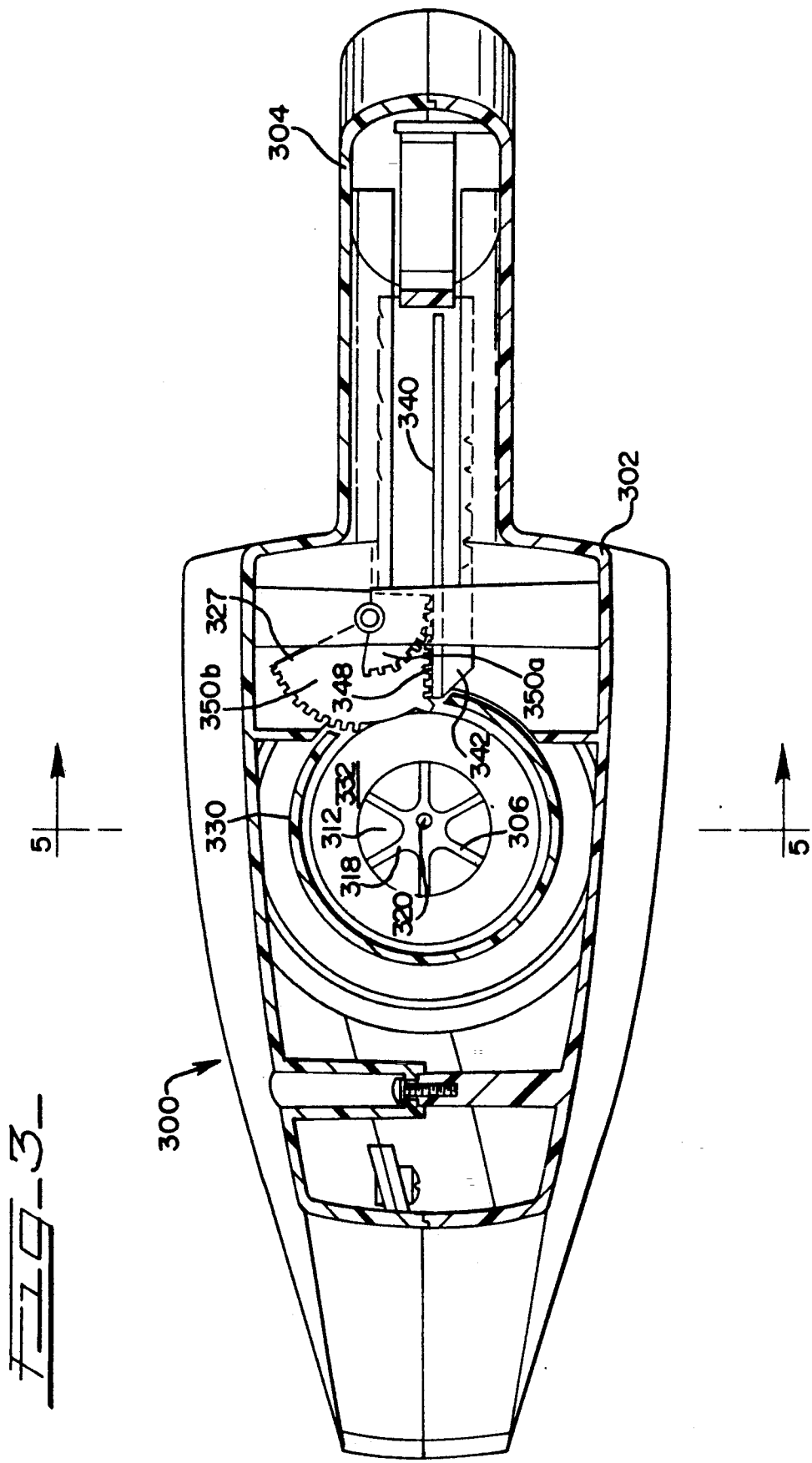

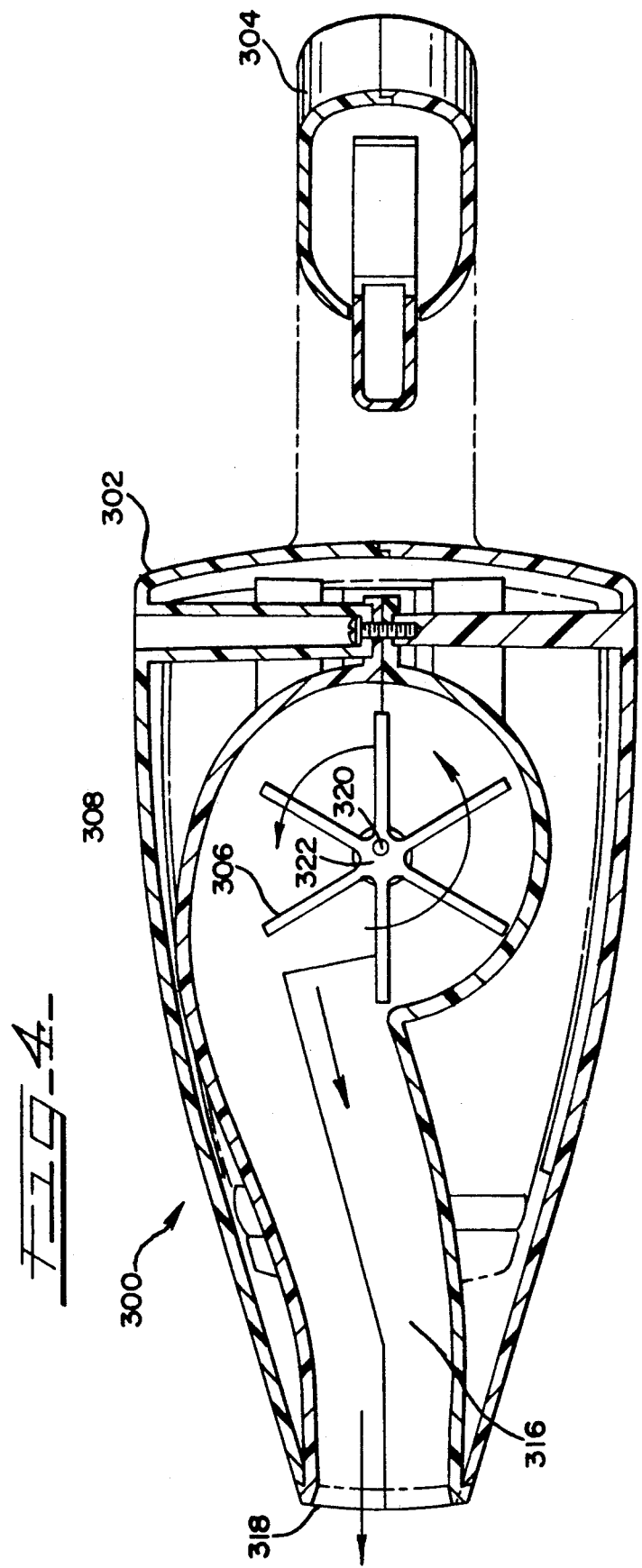

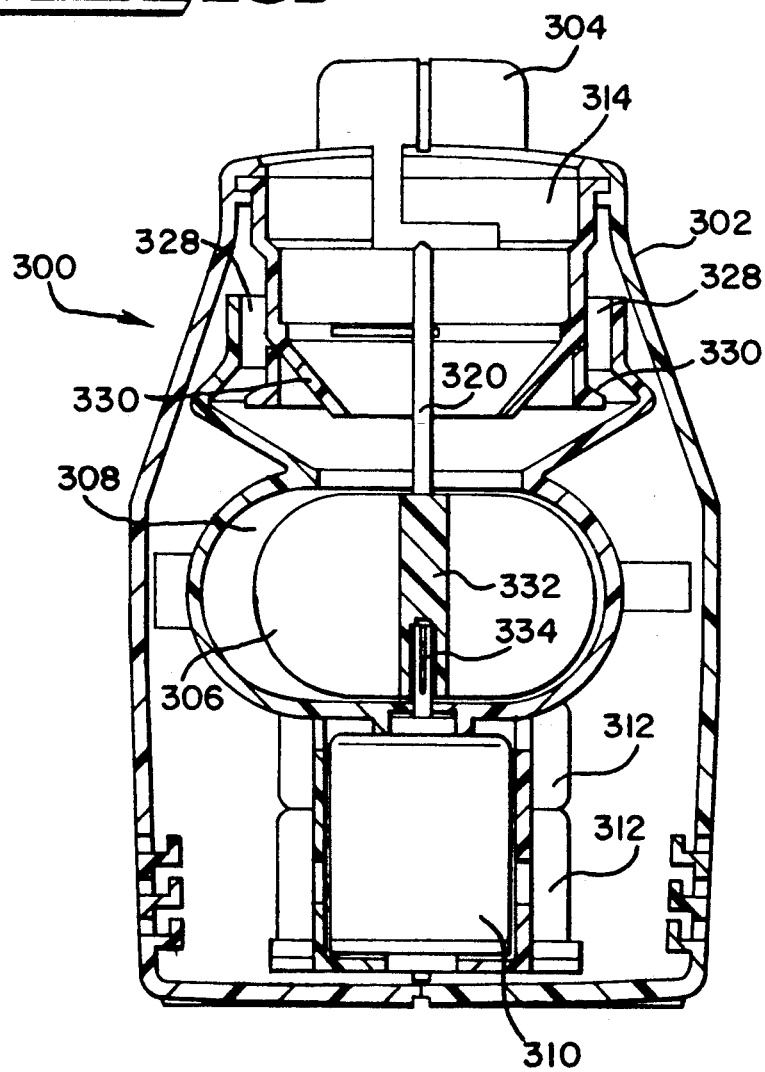

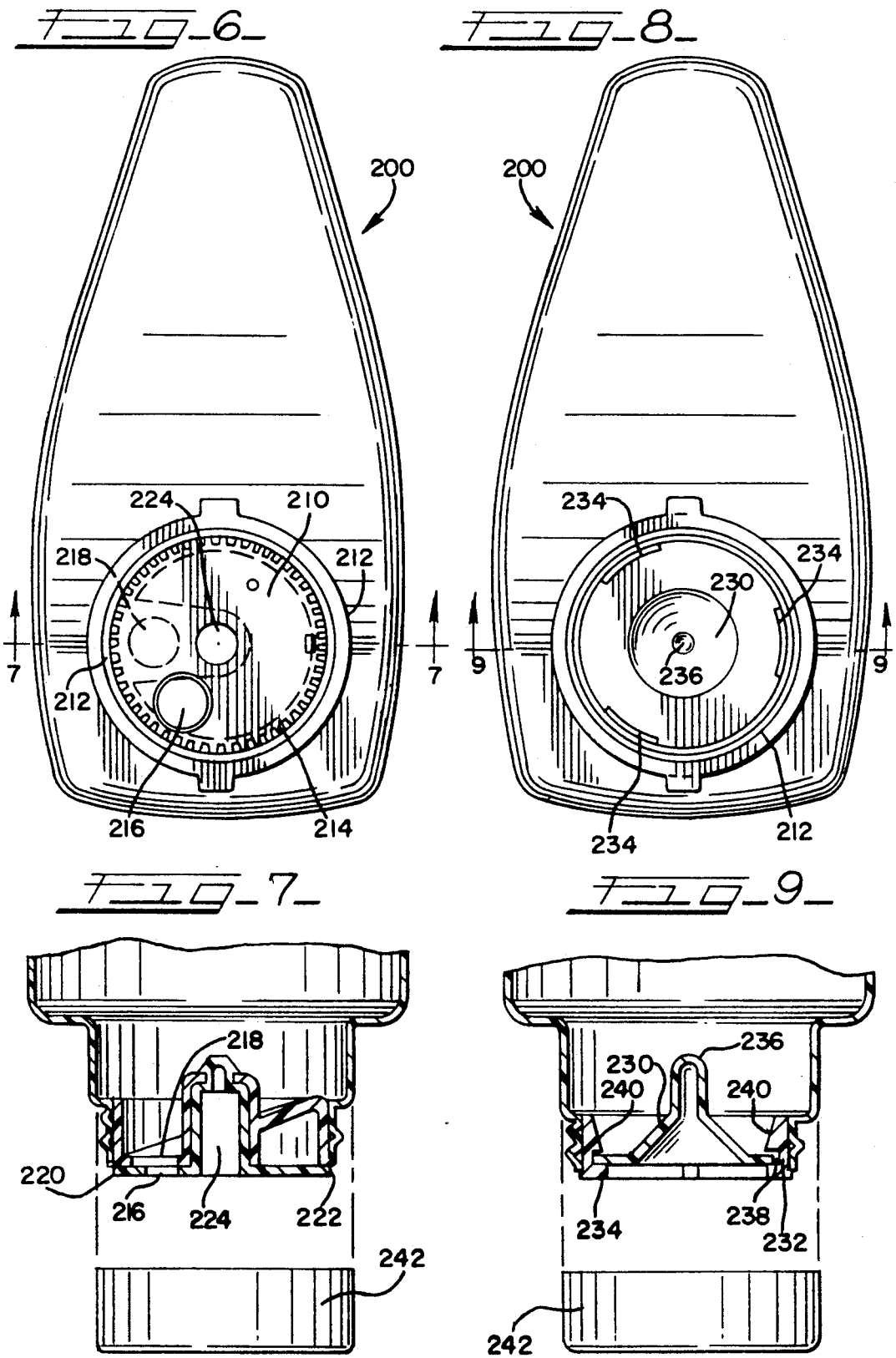

PORTABLE PARTICULATE MATERIAL SPREADER

TECHNICAL FIELD

This invention relates to the field of devices for dispensing dry materials and, more particularly, to a portable motor-driven spreader for particulate materials.

BACKGROUND ART

Many mechanical devices exist that aid in the even dispensing and spreading of particulate material such as insecticide or fungicide dusts or granular particulate materials such as fertilizers. The simplest hand held spreaders for granulated products are manually operated by a rotary crank which either directly or indirectly turns a rotor which dispenses the particulate material from a hopper on the apparatus. U.S. Pat. No. 4,140,280 discloses one such apparatus. A portable battery-operated apparatus for such use is disclosed by U.S. Pat. No. 3,993,225. A somewhat different approach is disclosed by the invention of U.S. Pat. No. 4,678,377, in which a powder is contained in a flexible and manipulable pouch open at two ends through which a flow of air is forced by the drive mechanism to eject the dust.

One problem encountered in any mechanism for the dispensing of powdered material is the tendency of the material itself to lump and clog (as described in U.S. Pat. No. 4,712,716, which discloses a mechanism for metering dusting powder to assure even flow) or to bridge (as described in U.S. Pat. No. 4,071,170).

U.S Pat. No. 4,071,170 discloses a portable motor driven dusting apparatus which incorporates a mechanism to agitate the powdered material as it is being fed to the rotary blower to assure uniform rate of flow and avoid clogging or bridging problems.

SUMMARY DISCLOSURE OF THE INVENTION

The dispensing behavior of powdered materials is different from that of granular materials and the two types require different control and dispensing mechanisms. Usually a person desiring to spread an insecticide dust and a granular fertilizer would have to purchase two separate dispensing mechanisms. However, a single dispensing apparatus that could be used for either type of material eliminates the need for the purchase of two spreaders.

A desirable feature for such a spreader is ease of loading. Most existing devices require the user to procure the desired particulate material and manually transfer it from the original container into a hopper on the dispensing apparatus. A preferable method would be the direct dispensing of the material from its original container.

Another desirable feature in an apparatus which would be used to spread particulate materials such as fertilizers, pesticides or herbicides is minimal user contact with the materials, since physical contact by humans or animals with certain types of such materials should be avoided, due to irritation or even toxicological concerns.

The present invention discloses a portable particulate material spreader that may be used for dispensing either powdered or granular material. This apparatus is designed so that the material can be dispensed directly from its original container. This spreader system is self-contained and thus minimizes user contact with the particulate material.

The present invention is an apparatus for dispensing and spreading particulate material. The apparatus has two main parts: a container portion, which may be the original container in which the particulate matter has been purchased, and a dispensing portion, which includes a blower mechanism, a drive mechanism and energy supply, and a handle for the apparatus. The container has a necked opening, designed to connect with the inlet port of the blower chamber of the dispensing portion. The neck of the container portion is configured so as to allow capping of the container portion. Inside the neck, the container has a means for improving and controlling the flow of the particulate material from the container into the dispensing portion. The flow improvement and control means constitutes either (1) for use with powders, a stirring mechanism which agitates a nipple free-floating within the neck of the container and is actuated by the same drive mechanism as the blower mechanism, or, (2) for use with granulated materials, a ramp and gate valve mechanism located within the neck of the container. The dispensing portion has a housing, which includes a handle for the apparatus, a chamber containing a rotary vane, an inlet port to the chamber, a channel leading from the chamber to an outlet nozzle, an energy supply, a trigger located on the handle, and an activation means connected to both the trigger and the drive means for the rotary vane. The activation means incorporates a gearing mechanism that sequentially first activates the rotary vane and thereafter the flow improvement and control mechanism that allows the particulate material to be fed into the chamber containing the blower.

BRIEF DESCRIPTION OF THE DRAWINGS

FIG. 1 is a partially exploded perspective view of the invention.

FIG. 2 is a side sectional view of the dispenser portion of the invention taken in the direction of sectional lines 2—2 in FIG. 1.

FIG. 3 is a top sectional view of the dispenser portion taken along sectional lines 3—3 of FIG. 2, FIG. 4 is a top sectional view of the dispenser portion taken along sectional lines 4—4 of FIG. 2.

FIG. 5 is a head-on sectional view of the dispenser portion taken along sectional lines 5—5 of FIG. 3.

FIG. 6 is an end view of the container portion showing the flow improvement and control mechanism of one embodiment of the container portion.

FIG. 7 is a side sectional view of the flow improvement and control mechanism of one embodiment of the container portion taken along sectional line 7—7 of FIGS. 1 and 6.

FIG. 8 is an end view of the container portion showing the flow improvement and control mechanism of a second embodiment of the container portion.

FIG. 9 is a side section view of the flow improvement and control mechanism of a second embodiment of the container portion taken along sectional line 9—9 of FIG. 8.

MODES FOR CARRYING OUT THE INVENTION

In the detailed description of the drawings, like reference numbers are used on the different figures to refer to like parts. FIG. 1 is a partially exploded perspective view of the spreader 100 showing container portion 200 and dispenser portion 300 detached from each other.

Container portion 200 has container housing 202 which has neck portion 204 and container handle portion 206.

Dispenser portion 300 has dispenser outer housing 302 with dispenser handle portion 304 integrally formed therefrom. Dispenser outer housing 302 has formed therein inlet port 314. Protruding from inlet port 314 is control shaft 320. Located upon dispenser handle portion 304 is trigger 322. Along the lower portion of dispenser outer housing 302 are air intake vents 324. Container portion 200 and dispenser portion 300 interconnect by means of a bayonet connection comprising a pair of connection lugs 208 on the external surface of neck portion 204 of container portion 200. Connection lugs 208 are designed to fit into a pair of connection slots 326 in dispenser outer housing 302. Connection slots 326 extend radially outward from inlet port 314. This bayonet connection allows container portion 200 and dispenser portion 300 to be releasably interlocked by relative rotation of the two portions. Other suitable types of connection means such as mating screw threads may be used.

FIG. 2 is a side sectional view of dispenser portion 300 of spreader 100, taken along line 2—2 of FIG. 1, showing dispenser outer housing 302 surrounding blower chamber 308, which has inlet port 314 and outlet channel 316 leading from blower chamber 308 to outlet nozzle 318. Inlet port 314 has inserted therein inlet opening plug 319. Within blower chamber 308 is rotary vane 306 which is energized by electric motor 310 which is itself powered by batteries 312. Attached to the rotary vane 306 and protruding therefrom into inlet port 314 is control shaft 320.

When container portion 200 and dispenser portion 300 are interconnected and a flow improvement and control means is activated, particulate material is controllably released from container portion 200 into blower chamber 308, thence to be propelled, by the action of rotary vane 306, along outlet channel 316 and then ejected from outlet nozzle 318.

Air enters blower chamber 308 through air intake vents 324. The air travels up dispenser portion 300 and thence down inlet channel 328 and around baffle 330 into blower chamber 308, and, after inlet being accelerated by the motion of rotary vane 306 and mixing with the particulate material, likewise exits outlet nozzle 318. Inlet baffle 330 has been found to be essential to the operation of spreader 00 to assure that particulate material is guided along outlet channel 316 and ejected from outlet nozzle 318 rather than escaping out through inlet channel 328.

Within blower chamber 308 is rotary vane 306 with vane axle 332. Electric motor 310, powered by and connected by unshown wiring to batteries 312, has, protruding from one end, motor shaft 334, which connects to vane axle 332 and provides the turning power for rotary vane 306. Batteries 312 may be either disposable or rechargeable. If rechargeable batteries are to be used, dispenser outer housing 302 would have incorporated therein attachment means for recharging such batteries, preferably toward the front of the bottom portion of dispenser outer housing 302. At the end of vane axle 332 opposite from motor shaft 334 and located eccentrically thereupon is control shaft 320 which protrudes into inlet opening plug 319.

Passage of particulate material from interconnected dispenser portion 300 and container portion 200 is controlled by a flow improvement and control means which is manually activated. Manual activation is initiated by trigger 322, located upon dispenser handle portion 304. Trigger 322 has, toward one end, trigger spring structure 338 and, toward the other end, trigger slide portion 340. In place of trigger spring structure 338, a separate spring structure pressing against trigger 322 may be used.

Attached to trigger slide portion 340 is trigger slide flange 342. When trigger 322 is pressed backward in the direction of dispenser handle portion 304, trigger slide flange 342 presses first electrical contact 344 against second electric contact 346, thus completing, through unshown wiring, the circuit between electric motor 310 and batteries 312.

FIG. 3 is a top sectional view of dispenser portion 300, taken along sectional lines 3—3 of FIG. 2, showing inlet plug 319 and, located and partially visible within blower chamber 308, rotary vane 306. After trigger slide flange 342 has been caused, by the movement of trigger slide portion 340, to close the circuit between electric 0 motor 310 and batteries 312, further movement of trigger 322 interacts with and activates one embodiment of the flow improvement and control means of the invention, the embodiment designed to dispense granular materials. Trigger slide portion 340 has along one edge thereof a set of teeth, trigger slide teeth 348 and, positioned adjacent to inlet port 314, is double-tiered gear 350. Double-tiered gear 350 and trigger slide portion 340 are so positioned that trigger slide teeth 348 interact with teeth on a first gear segment 350a of double-tiered gear 350. Second gear segment 350b of double-tiered gear 350 is positioned at an angle to first gear segment 350a in such a way that, when container portion 200 and dispenser position 300 are interconnected, second gear segment 350b can interact with gate cover gear teeth 214 (shown in FIG. 6) on the flow improvement and control means of the invention, which is located within container portion 200. Thus, activation of spreader 100 proceeds sequentially. When trigger 322 is activated, electric motor 310 is activated, and rotary vane 306 is thus activated. Then, by the gearing sequence described above, the flow improvement and control means of the invention is activated.

This sequential action is essential, for if particulate material is admitted to blower chamber 308 before rotary vane 306 is spinning, the particulate material may clog or cake, at best preventing spreader 100 from operating until blower chamber 308 is cleared and, at worst, burning out electric motor 310.

Other configurations for activating the motor and the flow improvement and control means of the invention are possible, so long as they have the sequential activation feature essential for smooth operation of the invention.

FIG. 4 is a second top sectional view of dispenser portion 300 taken along line 4—4 of FIG. 2, showing rotary vane 306 centrally located within blower chamber 308.

Blower chamber 308 is shaped like a volute. Particulate material entering blower chamber 308 through inlet port 314 is forced by the action of multi-bladed rotary vane 306 around the periphery of blower chamber 308 in such a manner that the highest velocity of the particulate material is attained at that portion of blower chamber 308 which opens onto outlet channel 316. Outlet channel 316, leading from blower chamber 308 to outlet nozzle 318 has a recurved configuration. Rotary vane 306 is located within blower chamber 308 so that the center point of vane axle 332 is in a direct line with the center point of outlet nozzle 318.

FIG. 5 is a head on sectional view of dispenser portion 300 taken along line 5—5 of FIG. 2. FIG. 5 shows inlet channel 328 surrounding inlet opening plug 319 and inlet baffle 330. Inlet baffle 330 extends radially outward from inlet opening plug 319 into inlet channel 328. FIGS. 6 and 7 show a first embodiment of container portion 200. This embodiment is designed so that, when container portion 200 and dispenser portion 300 are interconnected and the flow improvement and control means is activated, a controlled flow of a granular particulate material, such as a fertilizer material, a pesticide material or even a quantity of seed, from container portion 200 into inlet port 314 and thence into blower chamber 308 is achieved.

FIG. 6 shows an end view of container portion 200 showing gate cover 210 which extends across the circumference of neck opening 212 of container portion 200. Around the circumference of gate 210 are a series of gate cover gear teeth 214. Gate cover 210 has, toward its circumference, gate opening 216, which, when aligned with ramp opening 218 (shown by broken lines) of ramp structure 220 (shown in FIG. 7), will allow particulate material to pass in a controlled manner from container portion 200 into blower chamber 308. As shown in FIGS. 2 and 3, this control is achieved by the interaction of trigger slide teeth 348 with gate cover gate cover gear teeth 214 (shown in FIG. 6) on gate cover 210, when container portion 200 and dispenser portion 300 are interconnected.

As FIG. 7, a partial side sectional view of container portion 200 (showing the flow improvement and control mechanism of one embodiment) taken along line 7—7 of FIGS. 1 and 6 shows, ramp structure 220 is integrally formed with first container plug 222, which fits, preferably with a friction fit, into neck opening 212 of container portion 200. Ramp structure 220 has a central recess 224, which appears as a circle (also numbered 224) in broken outline in FIG. 6. When container portion 200 and dispenser portion 300 are interconnected, control shaft 320 extends up into inlet opening plug 319 of container portion 200 and up into central recess 224 of ramp structure 220 where, upon activation of spreader 100, control shaft 320 turns inoperatively, since the motion of controls shaft 320 is not necessary for the operation of this embodiment of the flow control and improvement mechanism. Ramp structure 220 has, surrounding central recess 224, angled ramp floor 228 with ramp opening 218 (shown in FIG. 6 and indicated in FIG. 7) toward its lowest part. When container portion 200 and dispenser portion 300 are interconnected and as trigger slide teeth 348 on trigger slide portion 340 interact with and turn first gear segment 350*a*. Second gear segment 350*b* then itself interacts with the gate cover gear teeth 214 of gate cover 210 to move gate opening 216 into alignment with ramp opening 218, particulate material is admitted to blower chamber 308, the rate of admission being dependent on the size of the opening created by relative motions of gate opening 216 and ramp opening 218 and by the actual size of the holes themselves. The sizes of gate opening 216 and ramp opening 218 may be varied. Such size variation will control the rate of flow of the particulate material and is the ultimate determining factor for the type or particle size of the particulate material to be dispensed.

FIGS. 8 and 9 show a second embodiment of container portion 200. This embodiment is designed so that when container portion 200 and dispenser portion 300 are interconnected and the flow control and improvement means is activated, a controlled flow of finer particulate material, which, for this embodiment, would be dusts, such as insecticide dusts, from container portion 200 into blower chamber 308 is achieved.

FIG. 8 shows an external view of container portion 200, showing nipple 230, which is moveably fitted inside second container plug 232.

FIG. 9, a partial side sectional view of container portion 200 (showing the flow improvement and control mechanism of a second embodiment) taken along line 9—9 of FIG. 8 (which is the same as line 7—7 indicated on FIG. 1), shows nipple 230, which is free floating and held within second container plug 232 by retaining ring 234, which is integrally formed with second container plug 232. When container portion 200 and dispenser portion 300 are interconnected, control shaft 320 extends into nipple tip 236 of nipple 230. When control shaft 320 is moved in an eccentric orbit by the action of electric motor 310 translated through motor shaft 334 and vane axle 332, nipple 230 both floats from side to side and moves upward and downward within second container plug 232. When nipple 230 so moves, the dust inside container portion 200 filters down into blower chamber 308 through variable gap 238 between nipple 230 and the inner circumference of second container plug 232. The inner circumference of second container plug 232 has formed therein an inner holding edge 240 to limit the motion of nipple 230. The relative sizes and spacing of nipple 230, variable gap 238 and holding edge 240 may be varied. Again, such size variation will control the rate of flow of the particulate material and is the ultimate determining factor for the type or particle size of the dust to be dispensed. Nipple 230 may also be formed with one or mores holes through its side walls. Such holes would be sized to allow a greater predetermined rate of flow of material from container portion 200 into dispenser portion 300 than would result from the design of the described embodiment.

FIGS. 7 and 9 show container caps 242, identical for each embodiment, which may be affixed by matching screw threads or other suitable attachment means to neck portion 204 of container portion 200 for separate protection during transport, storage, and sale of container portion 200 when it is filled with the desired particulate material.

As will be apparent to one skilled in the art, various modifications can be made within the scope of the aforesaid description. Such modifications which are within the ability of one skilled in the art form a part of the present invention and are embraced by the claims. Examples of such modifications would be the use of a container portion that had, in addition to a neck opening, an opening on its base to allow it to be filled with particulate material without the need of detaching the container and dispenser portions of the apparatus. The flow improvement and control means of the preferred embodiments of the present invention are located within and affixed to the neck of the container portion. Such means could also be designed to be separately attachable to the spreader, either to the container or the dispenser portion.

What I claim is:

1. A portable apparatus for spreading particulate material adapted for use with particulate materials having different particle sizes and different flow behaviors having, in combination, a dispensing portion, the dispensing portion including a housing having therein a chamber with a rotary vane, the chamber having an inlet port to admit the particulate material to the chamber, an outlet nozzle from which the particulate material is ejected by the rotary vane, and a channel leading from the portion of the chamber containing the rotary vane to the output nozzle, energy supply means for powering said rotary vane operatively connected to the rotary vane, and detachably connected thereto, a container portion for holding the particulate material, and a flow improvement and control means for controllably transferring the particulate material from the container to the chamber, the controllable transfer being accomplished by a sequentially operational activation means for first activating the energy supply means, thereby activating the rotary vane, and then activating the flow improvement and control means, the adaptation of the apparatus for use with particulate materials having different particle sizes and flow behaviors being accomplished by having the dispenser portion designed so that it can be detachably connected to either a first or a second embodiment of the container portion, the first embodiment being designed to transfer powdered particulate materials into the dispensing portion and the second embodiment being designed to transfer granular particulate materials into the dispensing portion.

2. An apparatus according to claim 1 wherein the rotary vane has, attached thereto, a stirring and vibrating means designed to interact with the flow improvement and control means.

3. An apparatus according to claim 2 wherein the stirring and vibrating means is a control rod extending from the central axis of the rotary vane and into the inlet port of the chamber.

4. An apparatus according to claim 3 wherein the control rod is made to rotate eccentrically upon the rotary vane.

5. An apparatus according to claim 1, wherein the energy supply means is an electric motor connected to at least one battery, and the activation means further comprises a trigger mechanism which, when activated, first causes a first and a second switch contact to meet, thus completing the circuit between the electric motor and the battery, causing the motor to turn and thus activating the rotary vane attached to the motor by a motor shaft, activating the stirring and vibrating means attached to the rotary vane, the trigger mechanism secondly interacting with the flow improvement and control means.

6. An apparatus according to claim 1 wherein the detachable container portion has a neck with a neck opening, the neck being designed to removably interconnect with inlet port of the chamber of the dispensing portion and flow, improvement and control means are located within the neck opening.

7. An apparatus according to claim 6 wherein the flow improvement and control means is a ramp and gate valve mechanism designed, when the container portion and the dispensing portion are interconnected, to be activated by the interaction of a first set of gear teeth and a second set of gear teeth on the gate valve and on a slide portion of the trigger mechanism which allow a ramp portion hole and a gate valve hole to be aligned and thus allow particulate material to pass from the container position into the chamber.

8. An apparatus according to claim 1 wherein the detachable container portion has a neck with a neck opening, the neck being designed to removably. interconnect with inlet port of the chamber of the dispensing portion and flow improvement and control means are located within the neck opening.

9. An apparatus according to claim 3 wherein the flow improvement and control means is a nipple free-floating yet retained within the neck of the container portion and designed, when the container portion and the dispensing portion are interconnected, so the nipple is agitated by the control rod and, as it is agitated, moves within the neck and allows particulate material to pass at a pre-determined rate from the container portion and around the perimeter of the nipple and into the chamber.

10. An apparatus according to claim 8 wherein the flow improvement and control means is a nipple free-floating yet retained within the neck of the container portion and designed, when the container portion and the dispensing portion are interconnected, so the nipple is agitated by the control rod and, as it is agitated, moves within the neck and allows particulate material to pass at a pre-determined rate from the container portion and around the perimeter of the nipple and into the chamber.

11. An apparatus according to claim 1 wherein the chamber and the rotary vane are so designed that particulate material entering the chamber from the container portion is caused by the operation of the rotary vane, which is multi-bladed, to enter a zone of increased relative velocity tangential to the inner periphery of the portion of the wall of the chamber surrounding the rotary vane, the zone of increased velocity occupying a major portion of the inner periphery, the wall further forming a curved channel leading from the portion of the chamber surrounding the rotary vane to the outlet nozzle, the channel configured so as to receive the particulate material propelled into the increased velocity zone by the rotary vane and aligned so that the center point of the rotary vane is in a direct line with the center point of the outlet nozzle.

12. A portable apparatus for spreading particulate material adapted for use with particulate materials having different particle sizes and different flow behaviors comprising, in combination:

a dispensing portion, the dispensing portion including a housing having therein a chamber with a rotary vane, the chamber having an inlet port to admit the particulate material to the chamber, an outlet nozzle form which the particulate material is ejected by the rotary vane, and a channel leading from the portion of the chamber containing the rotary vane to the output nozzle, energy supply means for powering said rotary vane operatively connected to the rotary vane, and, detachably connected thereto, a container portion for holding the particulate material, the container portion having a neck with a neck opening, the neck being designed to removably interconnect with inlet port of the chamber of the dispensing portion, is a flow improvement and controls means, for controllably transferring the particulate material form the container to the chamber, the controllable transfer being accomplished by a sequentially operational activation means for first activating an energy supply means, thereby activating the rotary vane, and then activating the flow improvement and control means, the flow improvement and control means comprising a ramp and gate valve mechanism designed when the container portion and the dispensing portion are interconnected, to be activated by the interaction of a first set of gear teeth and a second set of gear teeth on the gate valve and on a slide portion of the trigger mechanism which allow a ramp portion hole and a gate valve hole to be aligned and thus allow particulate material to pass form the container position into the chamber.

13. An apparatus according to claim 12 wherein the chamber and the rotary vane are so designed that particulate material entering the chamber from the container portion is caused by the operation of the rotary vane, which is multi-bladed, to enter a zone of increased relative velocity tangential to the inner periphery of the portion of the wall of the chamber surrounding the rotary vane, the zone of increased velocity occupying a major portion of the inner periphery, the wall further forming a curved channel leading from the portion of the chamber surrounding the rotary vane to the outlet nozzle, the channel configured so as to receive the particulate material propelled into the increased velocity zone by the rotary vane and aligned so that the center point of the rotary vane is in a direct line with the center point of the outlet nozzle.

* * * * *

UNITED STATES PATENT AND TRADEMARK OFFICE
CERTIFICATE OF CORRECTION

PATENT NO. : 5,119,993
DATED : June 9, 1992
INVENTOR(S) : Gunzel et al.

It is certified that error appears in the above-indentified patent and that said Letters Patent is hereby corrected as shown below:

Column 8, claim 12, line 53, please replace "form" with the word
-- from --.

Column 8, claim 12, line 63, after "portion," please add the phrase
-- located within the neck opening of the container portion --.

Column 9, claim 12, line 12, please replace "form" with --from --.

Signed and Sealed this

Fourteenth Day of December, 1993

Attest:

BRUCE LEHMAN

Attesting Officer　　　Commissioner of Patents and Trademarks